United States Patent
Knausz et al.

(10) Patent No.: US 11,409,852 B2
(45) Date of Patent: *Aug. 9, 2022

(54) DEVICE WITH BIOMETRIC-GATED DISPLAY

(71) Applicant: IDEX Biometrics ASA, Oslo (NO)

(72) Inventors: Imre Knausz, Fairport, NY (US); Christopher A. Ludden, Pittsford, NY (US)

(73) Assignee: IDEX Biometrics ASA, Oslo (NO)

( * ) Notice: Subject to any disclaimer, the term of this patent is extended or adjusted under 35 U.S.C. 154(b) by 473 days.

This patent is subject to a terminal disclaimer.

(21) Appl. No.: 16/526,504

(22) Filed: Jul. 30, 2019

(65) Prior Publication Data
US 2021/0034726 A1 Feb. 4, 2021

(51) Int. Cl.
 *G06F 21/32* (2013.01)
 *G06K 19/07* (2006.01)
 *G06Q 20/34* (2012.01)
 *G06F 21/84* (2013.01)

(52) U.S. Cl.
 CPC ............ *G06F 21/32* (2013.01); *G06F 21/84* (2013.01); *G06K 19/0718* (2013.01); *G06Q 20/341* (2013.01)

(58) Field of Classification Search
CPC ..... G06F 21/32; G06F 21/84; G06K 19/0718; G06Q 20/341
See application file for complete search history.

(56) References Cited

U.S. PATENT DOCUMENTS

| 6,765,470 | B2 | 7/2004 | Shinzaki |
| 7,242,277 | B2 | 7/2007 | Minemura |
| 8,037,315 | B2 * | 10/2011 | Miyazaki ............ G06K 9/0002 713/186 |

(Continued)

FOREIGN PATENT DOCUMENTS

| EP | 3001372 | 3/2016 |
| EP | 3065098 | 9/2016 |

(Continued)

OTHER PUBLICATIONS

ScienceProg, "Microcontroller Brown-out detection", https://scienceprog.com/microcontroller-brown-out-detection/, 2008, 2 pages (Year: 2008).*

(Continued)

*Primary Examiner* — Carl G Colin
*Assistant Examiner* — Han Yang
(74) *Attorney, Agent, or Firm* — Smith Tempel Blaha LLC; Michael J. Tempel

(57) ABSTRACT

Biometric module configured to perform processing as part of a device configured to perform contactless or contact communication with a terminal, the module comprising: a biometric sensor; a display screen; and a control unit configured to: cause the biometric sensor to capture biometric data of a user which can be used to biometrically authenticate the user; obtain biometric authentication information indicating whether the user was biometrically authenticated based on the captured biometric data; and in response to the biometric authentication information indicating the user was biometrically authenticated, cause the display screen to display authenticated information.

15 Claims, 9 Drawing Sheets

(56) References Cited

U.S. PATENT DOCUMENTS

| | | | |
|---|---|---|---|
| 8,401,981 B1* | 3/2013 | Sandler | G06F 1/3212 |
| | | | 706/12 |
| 8,831,557 B2 | 9/2014 | Jung et al. | |
| 8,943,580 B2 | 1/2015 | Fadell et al. | |
| 9,697,345 B2 | 7/2017 | Mo et al. | |
| 9,798,917 B2 | 10/2017 | Benkley, III et al. | |
| 10,101,851 B2 | 10/2018 | Benkley, III et al. | |
| 10,114,497 B2 | 10/2018 | Benkley, III et al. | |
| 10,262,322 B2 | 4/2019 | Lee et al. | |
| 2007/0220273 A1 | 9/2007 | Campisi | |
| 2011/0084149 A1 | 4/2011 | Faith et al. | |
| 2013/0015949 A1 | 1/2013 | Sano | |
| 2013/0183936 A1* | 7/2013 | Smtih | H04W 12/06 |
| | | | 455/411 |
| 2015/0089636 A1* | 3/2015 | Martynov | G06F 21/84 |
| | | | 726/19 |
| 2015/0161595 A1* | 6/2015 | Sears | G06Q 20/409 |
| | | | 705/41 |
| 2017/0004475 A1 | 1/2017 | White et al. | |
| 2017/0286789 A1* | 10/2017 | Wintergerst Lavin | |
| | | | G06K 9/00912 |
| 2017/0314997 A1* | 11/2017 | Baum | G01J 5/0859 |
| 2018/0108018 A1* | 4/2018 | Lee | G06K 9/00013 |
| 2018/0373857 A1 | 12/2018 | Larsen | |
| 2019/0042822 A1 | 2/2019 | Benkley, III | |
| 2019/0236320 A1 | 8/2019 | Ahluwalia et al. | |
| 2019/0236321 A1 | 8/2019 | Poon et al. | |
| 2021/0192529 A1* | 6/2021 | Souchon | G06K 9/00926 |

FOREIGN PATENT DOCUMENTS

| | | |
|---|---|---|
| EP | 3121779 | 1/2017 |
| WO | 2019/175174 A1 | 9/2019 |
| WO | 2019/175179 A1 | 9/2019 |

OTHER PUBLICATIONS

PCT Application No. PCT/EP2020/071606, International Search Report and Written Opinion, dated Oct. 5, 2020, 15 pages.

\* cited by examiner

DEVICE WITH BIOMETRIC-GATED DISPLAY

BACKGROUND

A smart card may refer to a device that includes an embedded integrated circuit chip and internal memory. That internal memory may be located on the integrated circuit chip, or be a separate chip embedded within the card. A smart card may be a contact card, a contactless card, or may be capable of operating as a contact and contactless card. Some types of smart cards may contain an on-card power source, such as a battery or solar cell. Smart cards exist in a wide variety of form factors, including plastic cards, key fobs, watches, wearables, electronic passports and USB-based tokens, and subscriber identification modules (SIMs) used in mobile phones.

A contact card can receive power from, and communicate with, a terminal (e.g. a card reader) by physically connecting to the terminal. For example, a contact card may comprise one or more contact pads or elements that provide electrical connectivity to the terminal when the card and terminal are brought into suitable physical contact (e.g. by inserting the card into a slot within a terminal).

A contactless card can receive power from, and communicate with, a terminal without direct physical contact between the terminal and the card. Typically, a contactless card communicates with a terminal via radio waves. The contactless card may include an antenna to receive an electromagnetic signal, such as a radio frequency (RF) signal, emitted from a terminal. Likewise, data from the card can be communicated back to the terminal by means of the card's antenna.

Some contactless cards are 'passive'. A passive card powers the embedded chip from energy harvested from the signal emitted by the terminal. One way to harvest energy from the emitted signal is to arrange the antenna as a coil that induces a voltage across its terminals by means of induction when receiving the emitted signal.

Smart card technology is being implemented within a variety of devices used to perform increasingly varied functions, for example to perform payments, grant a user physical access to a region of an environment, to store personal identification information of the user, identify or authenticate a user, etc.

The embodiments described below are provided by way of example only and are not limiting of implementations which solve any or all of the disadvantages of known smart cards.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

Described herein is a biometric module configured to perform processing as part of a device configured to perform contactless or contact communication with a terminal, the module comprising: a biometric sensor; a display screen; and a control unit configured to: cause the biometric sensor to capture biometric data of a user which can be used to biometrically authenticate the user; obtain biometric authentication information indicating whether the user was biometrically authenticated based on the captured biometric data; and in response to the biometric authentication information indicating the user was biometrically authenticated, cause the display screen to display authenticated information.

A first aspect provides a biometric module configured to perform processing as part of a device configured to perform contactless or contact communication with a terminal, the module comprising: a biometric sensor; a display screen; and a control unit configured to: cause the biometric sensor to capture biometric data of a user which can be used to biometrically authenticate the user; obtain biometric authentication information indicating whether the user was biometrically authenticated based on the captured biometric data; and in response to the biometric authentication information indicating the user was biometrically authenticated, cause the display screen to display authenticated information.

The biometric module may be powered by a removable external power source.

The control unit may be further configured to, subsequent to causing the display screen to display authenticated information, determine whether the biometric module is currently receiving power from the external power source and in response to determining the biometric module is not currently receiving power from an external power source, cause the display screen to cease displaying the authenticated information.

The biometric module may further comprise one or more charging elements for storing charge, the one or more charging elements being arranged to be charged when the biometric module is receiving power from an external power source.

The one or more charging elements may comprise one or more capacitors.

The control unit may be further configured to only cause the display screen to display authenticated information if the charge stored by the one or more charging elements exceeds a threshold.

The threshold may be set such that the one or more charging elements hold sufficient charge to cause the display screen to display a different image when the module is not receiving power from the external power source.

The biometric module may further comprise a threshold detecting circuit for detecting whether the charge stored by the one or more charging elements exceeds the threshold.

The threshold detecting circuit may be a brown-out detection circuit.

The control unit may be configured to use the energy stored in the one or more charging elements to cause the display screen to cease displaying the authenticated information.

The control unit may be configured to cause the display screen to cease displaying the authenticated information by blanking the display screen.

The control unit may be further configured to: subsequent to causing the display screen to display authenticated information, cause the biometric sensor to capture proximity data indicative of whether the user is proximate the biometric module; obtain proximity information indicating whether, based on the captured proximity data whether the user is proximate the biometric module; and in response to the proximity information indicating that the user is not proximate the biometric module, cause the display screen to cease displaying the authenticated information.

The biometric sensor may be a fingerprint sensor and the proximity data may comprise data indicative of whether a user's finger is currently in contact with the fingerprint sensor.

The control unit may be further configured to determine whether the user is proximate the biometric module based on the proximity data captured by the biometric sensor.

The control unit may be further configured to perform at least a portion of the biometric authentication of the user based on the biometric data captured by the biometric sensor.

The control unit may be configured to receive the biometric authentication information from an external component that performs the biometric authentication of the user based on the biometric data captured by the biometric sensor.

A second aspect provides a device for contactless or contact communication with a terminal, the device comprising: an embedded chip configured to generate data for communication to the terminal to perform a first function associated with the device; and a biometric module comprising: a biometric sensor; a display screen; and a control unit configured to: cause the biometric sensor to capture biometric data of a user which can be used to biometrically authenticate the user; obtain information indicating whether the user was biometrically authenticated based on the captured biometric data; and in response to the information indicating the user was biometrically authenticated, cause the display screen to display authenticated information.

The device may be a smart card.

The authenticated information may comprise information to perform the first function associated with the device.

The device may further comprise an antenna for receiving a wireless signal emitted by the terminal.

There may be provided computer program code for performing a method as described herein. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
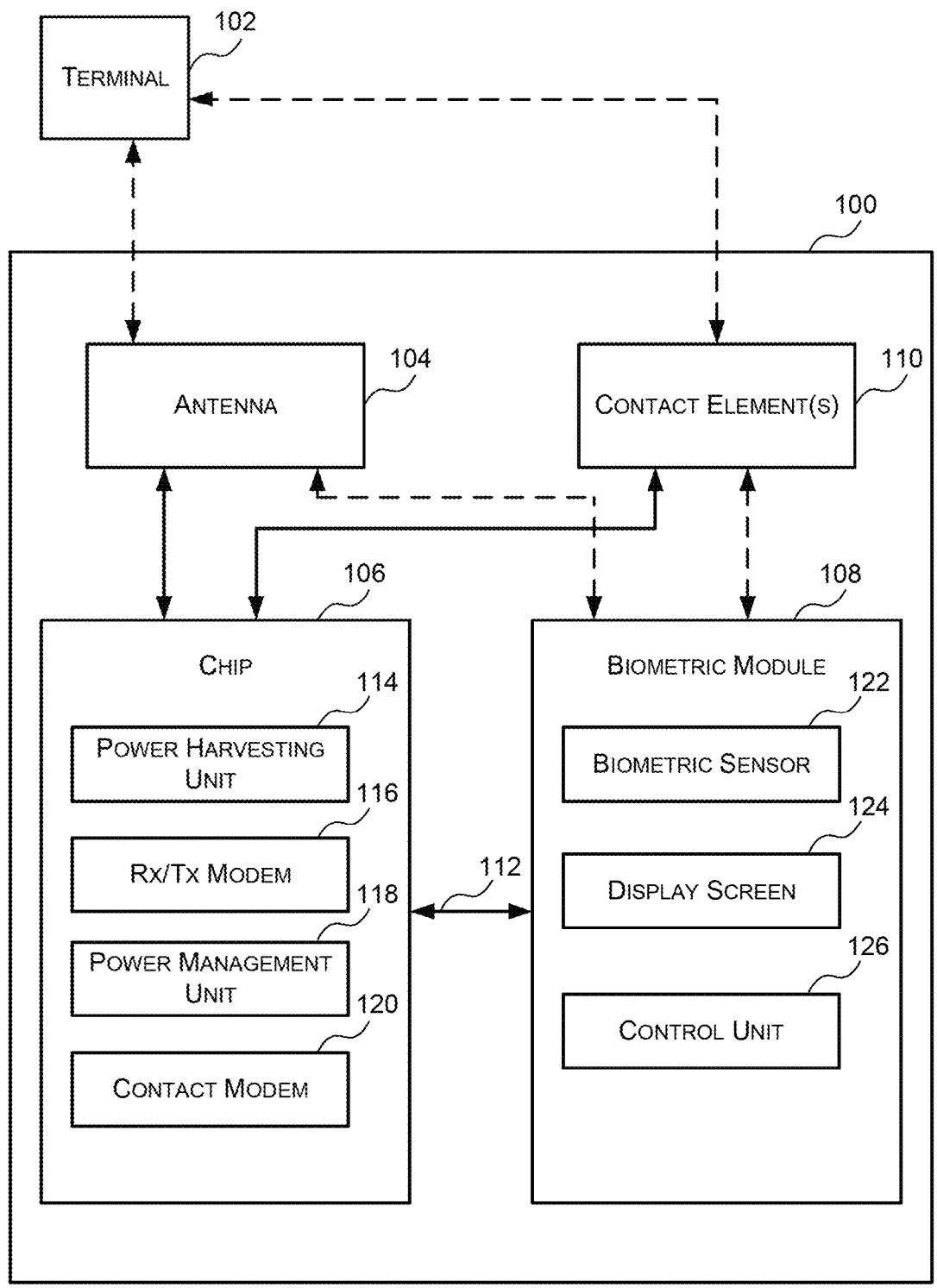
FIG. 1 is a block diagram of a device comprising a biometric module wherein the device is capable of contactless or contact communication with a terminal.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

Smart cards are increasingly incorporating additional components to increase security and/or to improve the user's experience of using the smart card. For example, biometric sensors, such as fingerprint sensors, are being incorporated into smart cards in order to provide user identity verification or authentication. Likewise, some smart cards feature a display screen which may be used for a variety of purposes, e.g. to display information associated with the card account or the card holder, to provide information during use of the card (e.g. transaction status, transaction amount, instructions to the user) and for decoration and branding (e.g. to highlight a logo, to personalise the card, etc.) A common use for a display screen on a bank card is to display the card verification value (CVV), or a dynamic CVV (dCVV) (i.e. a CVV that periodically changes).

However, the inventors have identified that the security of a smart card can be further increased by incorporating both a biometric sensor for use in biometrically authenticating a user and a display screen wherein the display screen is controlled, or gated, based on the biometric authentication of the user. Specifically, such a configuration can be used to ensure that authenticated or sensitive information is only displayed to an authenticated user (e.g. the card holder).

Accordingly, described herein are devices (e.g. smart cards) for contactless and/or contact communication with a terminal (e.g. a card reader) that comprise an embedded chip configured to generate data for communication to the terminal to perform a first function associated with the device; and a biometric module that comprises a biometric sensor, a display screen, and a control unit configured to cause the biometric sensor to capture biometric data of a user which can be used to biometrically authenticate the user; and in response to the user being biometrically authenticated based on the captured biometric data, cause the display screen to display authenticated information. As described in more detail below, in some cases, the control unit may be further configured to, subsequent to causing the display screen to display authenticated information, control the biometric sensor to obtain proximity data which can be used to determine whether the user is proximate the biometric module, and in response to the proximity data indicating that the user is no longer proximate the biometric module cause the display screen to cease displaying the authenticated information.

Reference is now made to FIG. 1 which illustrates an example device 100 capable of communicating with a terminal 102 via a contact or contactless interface to perform a first function.

The device 100 and the terminal 102 may take one of many form factors. The device 100 may be, for example, a smart card an ID card, a passport, a fob, a dongle, a security token (e.g. a USB token) etc. Alternatively, the device 100 may be integrated in a communication device such as a mobile phone or smartphone; a wearable device, such as a bracelet, watch, a glove/pair of gloves, a pin (e.g. a brooch), a badge or some other contactless wearable device. The terminal 102 may be, for example, a card reader, such as a point-of-sale (POS) terminal, a cash register, an ATM machine, a computer, a smartphone etc. In some examples, the device may be a proximity integrated circuit card (PICC) and the terminal may be a proximity coupling device (PCD).

The device 100 comprises an antenna 104, a chip 106, a biometric module 108 and one or more contact elements 110. The chip 106 is embedded within the device 100 and may be, for example, a Secure Element. The biometric module 108 may also be embedded within the device 100. In this example the biometric module 108 is a physically distinct component from the chip 106. Each of the chip 106 and the biometric module 108 may be implemented on one or more respective integrated circuit chips embedded in the device 100. The biometric module 108 and chip 106 are connected to each other by one or more links, shown generally at 112. One or more of the links 112 may by a bus. In other examples the biometric module 108 and the chip 106 may be physically connected, but logically separate entities.

The device 100 communicates with the terminal 102 (e.g. transmits message to and/or receives messages from the terminal) through the antenna 104 when the device 100 is operating in contactless mode, and through the contact element(s) 110 when operating in contact mode. Although a single contact element 110 is shown in FIG. 1 in other examples there may be a plurality of contact elements.

The contact element(s) 110 is/are connected to the chip 106 by any suitable means, such as, but not limited to, one or more conductive links or elements. The contact element(s) 110 allow the device 100 to communicate with, and receive power from, the terminal 102 when the contact element(s) 110 are in suitable physical contact with corresponding elements of the terminal 102. Accordingly, when the device 100 is operating in contact mode the chip 106 receives power from the terminal 102 via the contact element(s) 110. In some cases, the device 100 may communicate with terminal 102 in accordance with the ISO7816 standard when operating in contact mode.

In the example shown in FIG. 1 the contact element(s) 110 are also connected to the biometric module 108 so that the biometric module 108 can also receive power from the contact element(s) 110. However, in other examples, the contact element(s) 110 may only be connected to the chip 106 such that the chip 106 receives power from the terminal 102 when operating in contact mode and manages the received power to power its internal components and supply power to the biometric module 108.

Similarly, the antenna 104 is connected to the chip 106 by any suitable means, such as, but not limited to, one or more conductive links or elements. The antenna 104 allows the device 100 to wirelessly communicate with, and harvest power from, the terminal 102 when the device 100 is within suitable proximity, or range, of the terminal 102. Specifically, the chip 106 comprises a power harvesting unit 114, a transceiver modem 116, a power management unit 118 and a contact modem 120. In some cases the antenna 104 may also be connected to the biometric module 108 by, for example, physical links, such as, but not limited to conductive links or elements. In these cases, the biometric module 108 comprises its own power harvesting unit to harvest power from the received wireless signal. However, in other cases, the antenna 104 may only be connected to the chip 106 and the chip 106 may be configured to distribute the power harvested from the received wireless signal to the chip 106 and the biometric module 108.

The power harvesting unit 114 is configured to harvest power from a wireless signal emitted by the terminal 102 which is received by the antenna 104 when the device 100 is operating in contactless mode. The power harvesting unit 114 may, for example, induce a voltage from the received signal emitted by the terminal 102. That induced voltage can be supplied to other components of the chip 102 and the biometric module 108. The wireless signal emitted from the terminal 102 may be a radio frequency (RF) signal governed by a radio communications standard. In one example, the wireless signal may be a near field communication (NFC) signal.

The transceiver modem 116 is configured to manage the transmission of messages to, and reception of messages from, the terminal 102 when the device 100 is operating in contactless mode. Specifically, the terminal 102 may be configured to transfer data to the device 100 by modulating (e.g. amplitude modulating) a carrier signal with the data it wishes to transfer. In these cases the modem 116 may be configured to extract the data from the received wireless signal by demodulating (e.g. demodulating the amplitude of) the received signal.

Similarly, the modem 116 may be configured to transfer messages to the terminal by modulating data generated by the chip 106 onto the wireless signal emitted from the terminal. In some cases, the modem 116 may be configured to modulate the received signal by applying a modulated load to the antenna 104. Modulating the antenna load at the device varies the power drawn from the received signal in accordance with the modulation. The variations in the drawn power can be detected by the terminal 102 and interpreted as data.

The power management unit (PMU) 118 is configured to manage, or control, the use of power (either harvested by the power harvesting unit 114 in contactless mode or supplied through the contact element(s) 110 in contact mode) by the chip 106. The PMU 118 may control the power consumed by the other components of the chip 106 to perform their tasks. In cases in which the biometric module 108 is not connected to the antenna 104 or contact element(s) 110, the PMU may also control the supply of power received from, or harvested from, the terminal 102 to the biometric module 108.

The chip 106 further comprises a contact modem 120 that manages the transmission of messages to, and the receipt of messages from, the terminal 102 when operating in contact mode. The contact modem 120 may be configured to ensure the communications between the chip 106 and terminal 102 satisfy any relevant standards (e.g. the ISO7816 standard) when the device 100 is operating in contact mode.

The biometric module 108 is configured to capture biometric data of a user for use in biometrically authenticating the user; and if the user is biometrically authenticated, display authenticated information to the user. The biometric module 108 is a unit that comprises one or more components that together perform the functions of obtaining biometric data and displaying information to the user based on biometric authentication performed on that biometric data. The components that form the biometric module may be implemented on, or by, a singled integrated circuit chip or two or more of the components that form the biometric module may be implemented on, or by, different integrated circuit chips.

The biometric module 108 comprises a biometric sensor 122, a display screen 124 and a control unit 126. The biometric sensor 122 is configured to capture biometric data of a user which can be used to biometrically identify or authenticate the user. The biometric authentication based on the biometric data obtained from the biometric sensor 122 may be performed by the biometric module 108, the chip 106, or the biometric module 108 and the chip 106. Example biometric identifications that may be performed by the biometric module 108 and/or the chip 106 include, but are not limited to: fingerprint recognition; iris recognition; vein recognition; retina recognition; voice recognition; behavioural recognition; facial recognition etc. In some cases, the biometric authentication may be performed as part of or in conjunction with the first function. For example, in some cases the biometric authentication and subsequent display of authenticated information may be performed in response to a request to perform biometric authentication from the chip 106.

The display screen 124 is configured to display information and specifically authenticated information. In some cases, the display screen 124 may be a touch-screen display to allow the user to provide a control input such as a press, tap or gesture, or to provide a data input, such as to input a character or instructions.

The term "authenticated information" is used herein to mean information that is only to be displayed to an authenticated user (e.g. a user authenticated by the biometric data captured by the biometric sensor 122). Authenticated information may alternatively be referred to herein as private information, secure information or authorized information. In some cases, the authenticated information may be information for use in conjunction with the first function. For example, where the first function is a type of banking functionality, such as the performance of financial transaction (e.g. a credit card transaction) the authenticated information may include one or more of: a card validation value (CVV)/card validation code (CVC) or a dynamic card validation value (dCVV)/dynamic card validation code (dCVC); the card holder's name; at least a portion of the credit card number; the credit card's expiry date. Although some of this information is currently displayed on credit cards with or without a display screen and thus is available to any user of the card (authenticated or not) the security of the card could be further improved by making that information only available to an authenticated user. In particular, if this information is only displayed to an authenticated user then it may make it difficult, if not impossible, for a non-authenticated person to complete a transaction using the device 100. Specifically, some salesclerks may require a user to supply one or more of these pieces of information to complete a transaction. For example, a salesclerk may ask the user of a credit card to provide the last four digits of the credit card to validate the credit card and ensure the credit card is not a fake card. In the embodiments described herein only the card holder will be able to verify that information.

It will be evident to person of skill in the art that these are examples only of authenticated information and that in other examples there may be other authenticated information. What is designated as authenticated information may be determined by the issuer of the device 100 based on, for example, the function of the device 100. For example, where the first function is permitting access to a physical location the authenticated information may include a code which the user has to input to an input device to gain access to the physical location. In some cases, the authenticated information may be generated by the chip 106 as part of the first function and provided to the biometric module 108. In other examples, the authenticated information may be generated by the biometric module 108 or another component of the biometric module 200.

In some cases, the display screen 124 may also display non-authenticated information. The term "non-authenticated information" is used herein to mean information that could be displayed to anyone, regardless of whether they are the authenticated user of the device, without risk. Non-authenticated information may alternatively be referred to herein as public information, non-secure information or unauthorized information. In some cases, the non-authenticated information may be information for use in conjunction with the first function. For example, where the first function is a type of banking functionality, such as the performance of financial transaction (e.g. a credit card transaction) the non-authenticated information may include one or more of: the card-issuer's name, the card service provider's name, logos, decoration on the device, advertisements, instructions or information to the user, status information such as the strength of the contactless field, whether the biometric authentication has been successful or not and so on. If this non-authenticated information is displayed to a non-authenticated person, it does not permit them to perform the first function.

It will be evident to person of skill in the art that these are examples only of non-authenticated information and that in other examples there may be other non-authenticated information. In some cases, the non-authenticated information may be generated by the chip 106 as part of the first function and provided to the biometric module 108. In other examples, the non-authenticated information may be generated by the biometric module 108 or another component of the biometric module 200.

The control unit 126 is configured to, in response to a user being biometrically authenticated based on biometric data captured by the biometric sensor 122, display authenticated information to the user on the display screen 124. This ensures that the authenticated information is only displayed to an authenticated user. When displaying authenticated information, the control unit 126 may additionally display non-authenticated information to the authenticated user. For example, the display may show the CVV number (i.e. authenticated information) at the same time as displaying the card issuer's logo (i.e. non-authenticated information). As described in more detail below, in some cases the control unit 126 may only enable (e.g. power) the display screen 124 once a user has been authenticated so that the display screen 124 does not display any information unless the user is authenticated. In other cases, the control unit 126 may enable the display screen 124 even if the user has not been biometrically authenticated, but, if the user has not been biometrically authenticated only allow non-authenticated information to be displayed on the display screen 124.

It will be evident to a person of skill in the art that this is only an example of a device that can communicate with a terminal and in other examples the device may not comprise the contact element(s) and contact modem such that the device is only able to operate in contactless mode or the device may not comprise the antenna, power harvesting unit and transceiver modem such that the device is only able to operate in contact mode.

Figure 2:
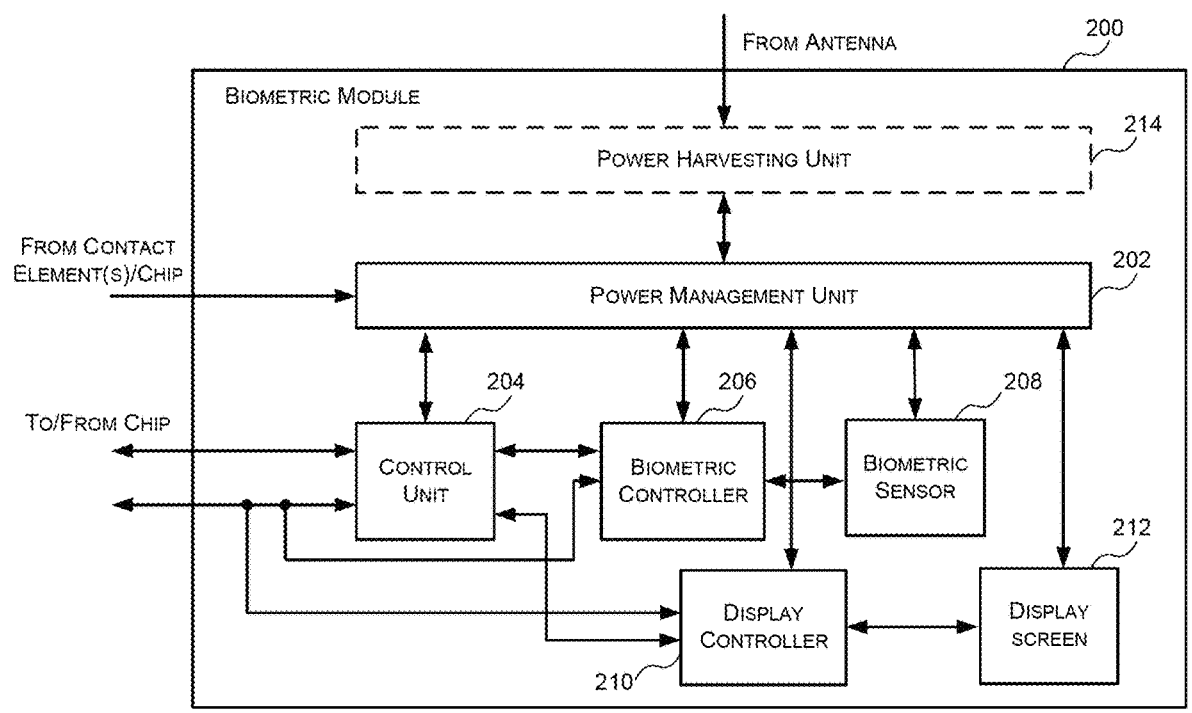
FIG. 2 is a block diagram of a first example implementation of the biometric module of FIG. 1.

Reference is now made to FIG. 2 which illustrates a first example biometric module 200 which can be used to implement the biometric module 108 of FIG. 1. The biometric module 200 is configured to capture biometric data for use in biometrically identifying or authenticating a user of the device 100 and to display authenticated information to a biometrically authenticated user. As noted above, the authenticated information may be information for use in performing the first function (e.g. information for use in performing a financial transaction). The biometric module 200 comprises a power management unit 202, a control unit 204, a biometric controller 206, a biometric sensor 208, a display controller 210 and a display screen 212. In some cases (e.g. when the device 100 adopts an architecture in which both the chip 106 and the biometric module 108 are connected to the antenna 104) the biometric module 108 may also comprise a power harvesting unit 214. The components of the biometric module 200 may be interconnected via any suitable means (e.g. via individual communication links or via a bus that is common to one or more of the components). In some cases, all of the components of the biometric module (e.g. the power management unit 202, control unit 204, biometric controller 206, biometric sensor 208, display controller 210, display screen 212, and optional power harvesting unit 214) may be implemented on, or by, a singled integrated circuit chip. However, in other cases, at least two of the components of the biometric module may be implemented on, or by, different integrated circuit chips. For example, in some cases, the display controller and the display screen may be implemented on a separate integrated circuit chip from the remaining components.

In the examples described herein the biometric module 200 does not have its own power source or supply, such as a battery, and relies on power received from the contact element(s) 110 when the device 100 is operating in contact mode or the antenna 104 when the device 100 is operating in contactless mode, which may be received directly from the contact element(s) 110 or the antenna 104 respectively, or via the chip 106. However, in other examples the biometric module may comprise an internal or on-board power source (e.g. battery). Accordingly, the power management unit 202 may receive power from: the contact element(s) when the device 100 is operating in contact mode, the power harvesting unit 214 (if the biometric module 200 has one) when the device 100 is operating in contactless mode, and/or from the chip 106 and manages or controls the distribution of power to the components of the biometric module 200. In some cases, when the device 100 is operating in contactless mode the power management device 100 receives a rectified voltage from power harvested by the power harvesting unit 214.

The power management unit 202 may be physically interconnected to each of the control unit 204, the biometric controller 206, the biometric sensor 208, the display controller 210 and the display screen 212. This allows the power management unit 202 to control the power supplied to each of these components separately. The inclusion of the power management unit 202 within the biometric module 200 also enables the biometric module 200 to control the power consumption of each of its internal components independent of the chip 106.

The biometric sensor 208 is configured to capture biometric data of a user which can be used to identify or authenticate the user. In some examples, the biometric sensor 208 may capture the biometric data by capturing images of a biometric source. The biometric sensor 208 may be, for example, a fingerprint sensor (a single or double-sided sensor), a retina sensor, an iris sensor, a vein sensor, a facial sensor, or a voice/audio sensor etc.

The biometric controller 206 is configured to control the operation of the biometric sensor 208. The biometric controller 206 may, for example, be configured to instruct the biometric sensor to enter acquisition mode in which the sensor captures biometric data (e.g. a fingerprint pattern, retina pattern, iris pattern etc.). The biometric controller 206 may receive any data captured by the biometric sensor 208 and provide the captured data to the control unit 204. In some cases, the biometric controller 206 may be able to transition the biometric sensor 208 between multiple states including an acquisition state and a low power state. In some cases the biometric controller 206 may be implemented by an application-specific integrated circuit (ASIC).

The display screen 212 is any suitable electronic display screen which can display an image and/or information in response to electrical energy. As the power to operate the display screen 212 may be limited, particularly when operating in contactless mode, the display screen 212 may be capable of displaying information with a limited amount of power. In some cases the display screen may cover all or a portion of a surface of the device 100. For example, where the device 100 is a card (e.g. a smart card) the display screen 212 may cover all or a portion of a face (e.g. front face) of the card.

In some examples, the display screen 212 may be a liquid crystal display (LCD) display. As is known to those of skill in the art, an LCD display uses liquid crystals to switch pixels on and off to reveal a specific colour. In other examples, the display screen 212 may be an organic light-emitting diode (OLED) display. As is known to those of skill in the art OLED is a flat light emitting technology, made by placing a series of organic thin films between two conductors. When electrical current is applied, a bright light is emitted. An OLED display typically consumes less power than a similarly sized LCD display, but is currently more expensive.

In yet other examples, the display screen 212 may be a microLED display. As is known to those of skill in the art, microLED takes traditional self-emanating LEDs (as opposed to OLEDs) and shrinks them down to the microscopic level. This allows microLEDs to produce an image quality similar to OLED without having to use an organic substrate. One of the other benefits of microLED technology is that the location of the display screen can be hidden unless it is activated or displaying information.

In yet other examples, the display screen 212 may be an electronic paper display (EPD) display. As is known to those of skill in the art, in contrast to other display technologies such as OLED, LCD and microLED which use backlighting to illuminate pixels, an EPD uses the scientific phenomenon called electrophoresis, which refers to the motion of electrically-charged molecules within an electric field. EPD does not require electricity to sustain an image, it only needs power to change the displayed image. EPD displays are particularly well suited for use in a smart card because they can be made from flexible electronics (and thus can flex with the card during use), they are robust enough to withstand daily use, they are visible in a variety of different light conditions and they consume a small amount of power relative to other display technologies. It will be evident to a person of skill in the art that these are examples only and that the display screen 212 may be implemented by any suitable display technology.

In some cases, the display screen 212 may be a touch-screen display to allow the user to provide a control input such as a press, tap or gesture, or to provide a data input, such as to input a character or instructions.

The display controller 210 is configured to control the operation of the display screen 212. Specifically, the display controller 210 may, for example, be configured to control the display screen 212 to cause it to display certain information (e.g. authenticated information and/or non-authenticated information). For example, where the display screen 212 is formed of a grid of pixels, the display controller 210 may be configured to activate certain pixels to display an image which conveys information to the user. In some cases, the information that is displayed on the display screen 212 may be generated by the control unit 204 and/or the chip 106. In some cases, authenticated information to be displayed on the display screen 212 (e.g. CVV or dCVV) may be generated by the chip 106 and any non-authenticated information to be displayed on the display screen 212 may be generated by the control unit 204. In some cases, the display controller 210 may be implemented by an ASIC.

The control unit 204 is configured to control the other components of the biometric module 200 (e.g. the biometric controller 206, the biometric sensor 208, the display controller 210 and the display screen 212) to capture biometric data of a user for use in biometrically authenticating the user and to display authenticated information to the user if they are biometrically authenticated. Specifically, the control unit 204 may be configured to: (i) control the operation of the biometric sensor 208 via the biometric controller 206 to obtain biometric data of a user which can be used to perform biometric authentication; (ii) perform biometric matching to compare the biometric data captured by the biometric sensor 208 to stored template data to determine if the user is biometrically identified or authenticated; and (iii) control the operation of the display screen 212 via the display controller 210 based on whether or not the user has been biometrically authenticated. In some cases, the control unit 204 may be implemented as a micro controller unit (MCU).

In some cases, the control unit 204 may be configured to cause (via the biometric controller 206) the biometric sensor 208 to capture biometric data of a user for use in biometrically authenticating the user in response to receiving a request from the chip 106 to perform biometric authentication and/or in response to determining (e.g. from information received from the power management unit 202) that the biometric module 200 has received enough power to be enabled.

The control unit 204 may be configured to perform the biometric matching in any suitable manner. For example, if the biometric data captured by the biometric sensor 208 is an image, the control unit 204 may perform image matching to compare an image captured by the biometric sensor 208 to one or more stored template images. A template image is a trusted image. An image may be trusted in the sense it is taken to be of a biometric source belonging to the user of the device 100. To perform the image matching, the control unit 204 may perform feature extraction on the captured image to identify a set of one or more extracted features. The extracted features are then compared with the features of the template image(s) to determine if the captured image matches the template image. The control unit 204 may, for example, compare the features of the images to determine a matcher score for the captured image. The captured image may be considered to match the template image(s) if the matcher score is above a predetermined threshold.

The control unit 204 may communicate an indication that the user has been biometrically authenticated to the chip 106. The chip 106 may then communicate an indication that the user of the device 100 has been authenticated back to the terminal 102. The authentication of the card user may enable the primary function associated with the device 100 to be completed. Alternatively, the control unit 204 may communicate to the chip 106 that the user was not successfully authenticated, in which the primary function associated with the device 100 may not proceed, or may proceed in an altered fashion.

In an alternative example, the biometric matching may be performed by the chip 106, rather than by the biometric module 200. Specifically, the biometric data captured by the biometric sensor 208 may be transmitted to the chip 106 and then the chip 106 performs the biometric matching. In a further alternative example, the biometric matching may be performed by the chip 106 in conjunction with the biometric module 200. Specifically, a portion of the biometric matching based on the biometric data captured by the biometric sensor 208 may be performed by the chip 106 and another portion of the biometric matching based on the biometric data captured by the biometric sensor 208 may be performed by the biometric module 200. Thus, in these two examples the biometric authentication is performed by both the chip 106 and the biometric module 200.

In each of these examples the control unit 204 is said to obtain biometric authentication information that indicates whether or not the user was biometrically authenticated based on the biometric data captured by the sensor. Depending on which component, or components, perform the biometric matching the control unit 204 may obtain the biometric authentication information as part of performing the biometric matching, or the control unit 204 may receive the biometric authentication information from an external component, such as the chip 106, which performs all or a portion of the biometric matching.

The control unit 204 is also configured to control the operation of the display screen 212 (e.g. via the display controller 210) based on whether the user has been biometrically authenticated or not (e.g. based on the biometric authentication information). Specifically, the control unit 204 may be configured to only allow authenticated information to be displayed on the display screen 212 if the user has been biometrically identified, or authenticated, based on the biometric data captured by the biometric sensor 208. This ensures that authenticated or secure information is only displayed to an authenticated user. In some cases, the control unit 204 may be configured to only enable or provide power to the display screen 212 if the user has been biometrically authenticated. In other cases, the control unit 204 may be configured to enable or power the display screen 212 even if the user is not successfully biometrically authenticated or identified, but only display non-authenticated information. For example, in some cases, if the user was not successfully authenticated or identified by the biometric data captured by the biometric sensor 208 a message or other indicator may be displayed on the display screen 212 to indicate that the user was not successfully identified.

In some cases, in addition to the biometric sensor 208 being able to capture biometric data of a user which can be used to biometrically identify, or authenticate, the user, the biometric sensor 208 may also be able to capture proximity data which can be used to determine whether the user is proximate the device 100 (e.g. whether the user is in contact with the device 100). For example, where the biometric sensor 208 is a fingerprint sensor, in addition to being able to capture a high resolution image of the user's finger which can be used to biometrically identify, or authenticate, the user, the biometric sensor may be able to capture a lower resolution image of the user's finger (or other object in contact with the biometric sensor 208) which can be used to determine whether the user's finger (or simply a finger) is in contact with or proximate the sensor. It will be evident to a person of skill in the art that this is an example only and that in other examples the biometric sensor may be able to capture different information which can be used to determine whether a user is present. For example, in other cases the biometric sensor may be able to measure the capacitance at one or more points of a surface of the sensor from which it can be determined that a person is touching the sensor. The proximity data captured by the biometric sensor 208 (e.g. lower resolution image) which can be used to determine whether the user is present or proximate may be provided to the control unit 204 (or, alternatively the chip 106) which determines from the captured proximity data whether the user is present.

The process of determining whether a user is present (e.g. capturing the relevant data from the sensor and analyzing the captured data) may be less power consuming than the process of biometrically identifying or authenticating the user. This may be because capturing proximity data may require less power than capturing biometric data and/or because the analysis performed on the captured proximity data is less computation and/or power intensive than the biometric matching process. For example, where the biometric sensor 208 is configured to capture an image of a biometric source the image captured for proximity detection (e.g. the proximity data) may have a lower resolution than the image captured for biometric authentication (e.g. the biometric data) and/or the image processing or filtering performed on the image captured for proximity detection may be less than the image processing or filtering performed on an image captured for biometric authentication. Furthermore, a simpler process may be used to determine from the captured image whether the user is present than the process used to biometrically authenticate a user from a captured image. For example, one or more aspects of the image captured for proximity detection may be simply compared against a threshold instead of using the much more complex biometric matching process. One or more of control unit use, component use, memory access and processing time may be reduced in proximity detection compared to the biometric authentication process.

In these cases, after a user has been biometrically authenticated the biometric module 200 may be configured to periodically capture proximity data from the biometric sensor which can be used to determine whether a user is present or proximate the device and if it is determined that the user is no longer present (e.g. where the biometric sensor is a fingerprint sensor, determining that the user's finger is no longer in contact with the fingerprint sensor) cease the display of authenticated information on the display screen 212. This may provide further protection for the authenticated information by only displaying the authenticated information if the user continues to be present. For example, once the user has been biometrically identified or authenticated from the biometric data captured by the biometric sensor, the control unit 204 may be configured to instruct the biometric controller 206 to periodically cause the biometric sensor 208 to capture proximity data that can be used to determine whether the user is present or proximate the device 100 (e.g. when the biometric sensor is a fingerprint sensor whether the user's finger is on the fingerprint sensor). The proximity data which can be used to determine whether the user is present (i.e. is proximate the device 100) may be provided to the control unit 204 which may determine from the proximity data whether the user is still present. In other cases, an external component, such as the chip 106, may be configured to determine form the proximity data whether the user is still present. In yet other cases control unit 204 in conjunction with an external component, such as the chip 106, may determine from the proximity data whether the user is still present.

In each of these cases the control unit 204 is said to obtain proximity information that indicates whether or not the user is present or proximate the device based on the proximity data captured by the sensor. Depending on which component, or components, perform the proximity detection or presence detection the control unit 204 may obtain the proximity information as part of performing the proximity detection, or the control unit 204 may receive the proximity information from an external component, such as the chip 106, which performs all or a portion of the proximity detection. If it is determined that the user is no longer present (e.g. from the proximity information) the control unit 204 may instruct the display controller 210 to cease displaying authenticated information on the display screen 212.

Some display technologies, such as, but not limited to, OLED and microLED only display information when power is applied thereto, and therefore when power is no longer applied to such displays, they will cease displaying information. Accordingly, where the display screen 212 is implemented using display technology that will cease displaying information when power is no longer applied thereto, the display controller 210 may cause the display screen 212 to cease displaying information (including any authenticated information) by ceasing to provide power thereto.

In contrast, other display technologies, such as, but not limited to, EPD and LCD can continue to display information even when power is not being applied thereto (even for a short time as is the case with LCD). For example, as described above, EPD displays generally only require power to change the image displayed thereon. In other words, EPD displays will generally continue to display the most recent image or information unless power is applied thereto to change the image or clear the display. Accordingly, where the display screen 212 is implemented using display technology that can continue to display information without power being applied thereto, the display controller 210 may cause the display screen 212 to cease displaying authenticated information by actively causing the display screen to no longer display the authenticated information. In some cases this may comprise actively causing the display screen to be cleared (i.e. no longer display any information), which may be referred to herein as blanking the display screen. In other cases, this may comprise actively causing the display screen to display a different image or set of information that does not include the authenticated information.

Once the biometric module 200 is no longer receiving sufficient power to power the biometric module 200 (e.g. because the contact elements 110 are no longer in contact with the corresponding elements of the terminal 102 or because the device 100 is not in sufficient proximity to the terminal 102 to be powered by the wireless signal generated thereby) the biometric module 200 can no longer biometrically identify, or authenticate the user and/or can no longer verify the presence of the user. Therefore, once power is removed from the biometric module 200 it can be considered 'not safe' to display authenticated information. Accordingly, in some cases, after the user has been biometrically identified, or authenticated, and the display screen 212 is being used to display authenticated information, the biometric module 200 may be configured to monitor whether the biometric module 200 is receiving sufficient power (e.g. from the terminal 102 via the contact element(s) or the received wireless signal) to power the biometric module 200 and if the biometric module 200 detects that it is no longer receiving sufficient power then the biometric module 200 may be configured to cease displaying authenticated information on the display screen 212.

In some cases, the power management unit 202 (or another component of the biometric module 200) may be configured to monitor the power received from the terminal (e.g. via the antenna or the contact elements) and if the power management unit 202 determines that the power received has fallen below a certain threshold, the power management unit 202 may be configured to notify the control unit 204 that the biometric module 200 is not receiving power (or not receiving sufficient power). When the device 100 is operating in contactless mode the amount of power that can be harvested from the wireless signal transmitted by the terminal 102 will be dependent on the distance between the device 100 and the terminal 102. During use the user may inadvertently vary the position of the device 100 such that the power drops while the first function is being performed. Accordingly, to avoid the power management unit 202 detecting that the biometric module 200 is not receiving sufficient power and the display screen being updated to no longer display authenticated information in response to temporary and inadvertent movement of the device 100 away from the terminal 102, the power management unit 202 may be configured to implement hysteresis or delay techniques (e.g. the power management unit 202 may be configured to determine the notify the control unit 204 that sufficient power is no longer being received if the power supply drops below the threshold for a predetermined amount of time).

Where the display screen 212 is implemented using display technology, such as, but not limited to, OLED technology or microLED technology, that will automatically cease displaying information when power is no longer supplied thereto the display screen will cease displaying authenticated information automatically when power is lost. In contrast, where the display screen 212 is implemented using display technology, such as, but not limited to EPD or LCD technology, that can display information even when power is no longer supplied thereto, then the image or information displayed by the display screen 212 has to be actively modified or updated (e.g. blanked) so that the display screen 212 no longer displays the authenticated information. However, since power is required to modify the image/information displayed by such a display screen, the authenticated information will continue to be displayed by such a display screen when the biometric module 200 has lost power. Accordingly, to be able to cease or stop displaying authenticated information after the biometric module 200 has lost power, in some cases the biometric module 200 may be configured to, when it initially detects that the biometric module 200 is receiving power, start storing a portion of the power, and only display authenticated information on the display screen 212 once sufficient power to be able to update or modify the image/information displayed by display screen 212 has been stored. This ensures that the biometric module 200 will be able to cease displaying any authenticated information if the biometric module 200 loses power.

For example, the power management unit 202 may comprise one or more charging elements (e.g. capacitors) which are configured to store charge temporarily. The charging element(s) are intended to be used to reliably store a small amount of charge temporarily and are not intended to include an on-board power supply such as, but not limited to a battery. In some cases, the charging element(s) may be arranged and/or configured such that the charging element(s) are quickly charged by substantially all the power received (e.g. from the contact elements(s), power harvesting unit 214 or chip 106). In other words, in these cases the charging element(s) is/are charged before any of the other components of the module 200 are provided power. In other cases, the charging element(s) may be arranged and/or configured such that the charging element(s) is/are slowly charged by a portion of the power the module 200 receives while another portion of the received power is being provided to one or more other components of the module 200.

The power management unit 202 may also comprise a detection circuit which is configured to detect whether the charge (e.g. voltage) of the one or more charging elements exceeds a threshold. The threshold may be selected so that there is at least sufficient power stored in the charging element(s) to update the display screen so as to cease the display of any authorized information (e.g. the power to blank the display). The threshold may be fixed or configurable. The threshold may be based on the parameters of the display screen 212. Specifically, the amount of power required to update the display screen so as to cease the display of any authorized information will depend on the size of the display screen and the display technology used to implement the display screen. For example, when the display screen is implemented by display technology that will only display information when power is applied thereto, the amount of power to update such a display screen so as to cease display of authorized information will be zero. In contrast, when the display screen is implemented by display technology that can display information even when power is not applied thereto, the amount of power to update such as display screen so as to cease display of authorized information will be non-zero.

In some cases, the detection circuit may be implemented by a brown-out detection circuit. As is known to those of skill in the art, a brown-out detection circuit monitors a supply voltage level and compares it to one or more thresholds and triggers an action based on whether the supply voltage falls below or exceeds one of the thresholds. For example, in some cases a brown-out detection circuit may have a low (or falling) threshold and/or a high (or rising) threshold. In these cases, when the brownout detection circuit detects that the monitored supply voltage falls below the low threshold the brownout detection circuit triggers one action (e.g. reset of the device) and when brownout detection circuit detects that the monitored supply voltage is above the high threshold the brownout detection circuit another action (e.g. coming out of reset). To use a brown-out detection circuit to detect when the charge of a charging element exceeds a minimum threshold, the high or rising threshold of the brown-out detection circuit may be set to the minimum threshold. In some cases, to avoid spikes in the power supply from triggering an action the brownout detection circuit may implement some hysteresis or delay. For example, the brownout detection circuit may be configured to only trigger an action when the power supply is above the high threshold for a predetermined period of time or below the low threshold for a predetermined period of time.

Figure 3:
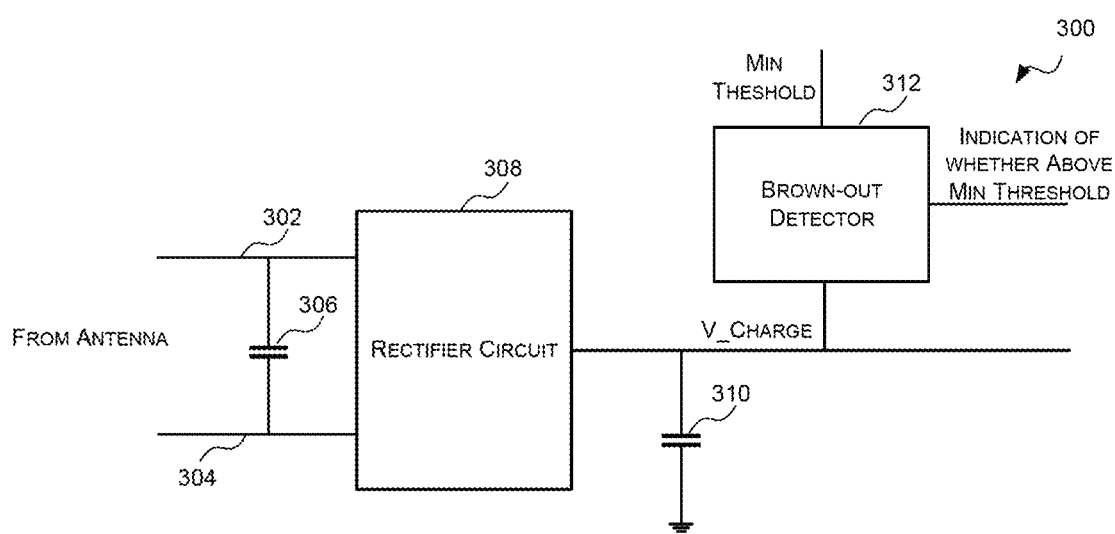
FIG. 3 is a schematic diagram of an example of a storage element in conjunction with a detection circuit.

Reference is now made to FIG. 3 which illustrates an example circuit 300 for storing energy received from the terminal when the device 100 is operating in contactless mode (i.e. the energy harvested from the wireless signal received by the antenna) and only enabling the biometric module 200 to perform biometric authentication and/or display authenticated information on the display screen 212 if the stored power exceeds a threshold. All or portion of the circuit 300 may form part of the power harvesting unit 214 and/or the power management unit 202.

The circuit 300 comprises first and second inputs 302 and 304 from the antenna 104 and a first capacitor 306. The capacitor 306 is positioned across the two inputs 302 and 304. Capacitor 306 is a tuning capacitor that tunes the antenna 104 to the frequency of the signal emitted by the terminal 102. In some examples, the signal emitted by the terminal 102 may be an NFC signal at a frequency of 13.56 MHz.

The circuit 300 further comprises a rectifier circuit 308 coupled to the terminals of the capacitor 306. The rectifier circuit 308 operates to rectify the voltage induced by the antenna 104.

The circuit 300 further comprises a charging element 310 to store charge. In this example, the charging element 310 is a capacitor which may be referred to herein as a reservoir capacitor. However, it will be evident to a person of skill in the art that this is an example only and any other suitable charging element may be used such as a super capacitor. The charging element 310 is coupled to the output of the rectifier circuit 308 such that the charging element 310 will be charged by the rectifier circuit 308 when the device 100 is operating in contactless mode (i.e. is receiving power via the antenna 104 from a wireless signal (e.g. NFC signal) transmitted by the terminal 102). The capacitor 310 may also act as a smoothing capacitor.

The circuit 300 further comprises a minimum threshold detection circuit 312 which is configured to determine when the charge stored by the charging element 310 exceeds a minimum threshold. In this example the minimum threshold detection circuit 312 is implemented as a brown-out detector which is configured to detect when the charge stored by the capacitor 310 (V_Charge) exceeds a minimum threshold and output an indication of whether the charge stored by the charging element 310 exceeds the minimum threshold. As described above, the minimum threshold may be set so that the charging element 310 holds enough, or sufficient, charge to update the display screen 212 so as to cease displaying authenticated information. This ensures that any authenticated information displayed on the display screen will be able to be removed even if the biometric module 200 stops receiving power from the terminal 102 (or another power source).

As is known to those of skill in the art, when the device 100 first starts receiving power from the wireless signal transmitted by the terminal 102 via the antenna 104 the rectifier circuit 308 will output a voltage which will charge the capacitor 310. When the capacitor 310 is fully charged and the device 100 is receiving power from terminal then the power output by the rectifier circuit will be used to power the biometric module 200 and the capacitor 310 remains charged. Subsequently when the device 100 stops receiving power from the terminal 102 (e.g. because the device 100 is moved out of range of the terminal 102) charge can be drawn from the capacitor 310 to power the biometric module 200. Specifically, charge can be drawn from the capacitor 310 to update the display screen 212 to stop displaying authenticated information.

Although not shown in FIG. 3, the brown-out detector 312 may also be used to detect when the biometric module 200 is no longer receiving power (or no longer receiving sufficient power). For example, the brown-out detector 312 may receive a low power threshold and may be configured to detect when V_Charge has dropped below the low power threshold.

Where the display screen 212 is implemented by a display technology that will only display an image, or information, when power is applied thereto the biometric module 200 may not comprise charging elements or a detection circuit as the display screen 212 will cease displaying information automatically when power is lost. Accordingly the charging elements and the detection circuit are optional features. Not including these features in the biometric module can save space and may make the biometric module less complex.

Figure 4:
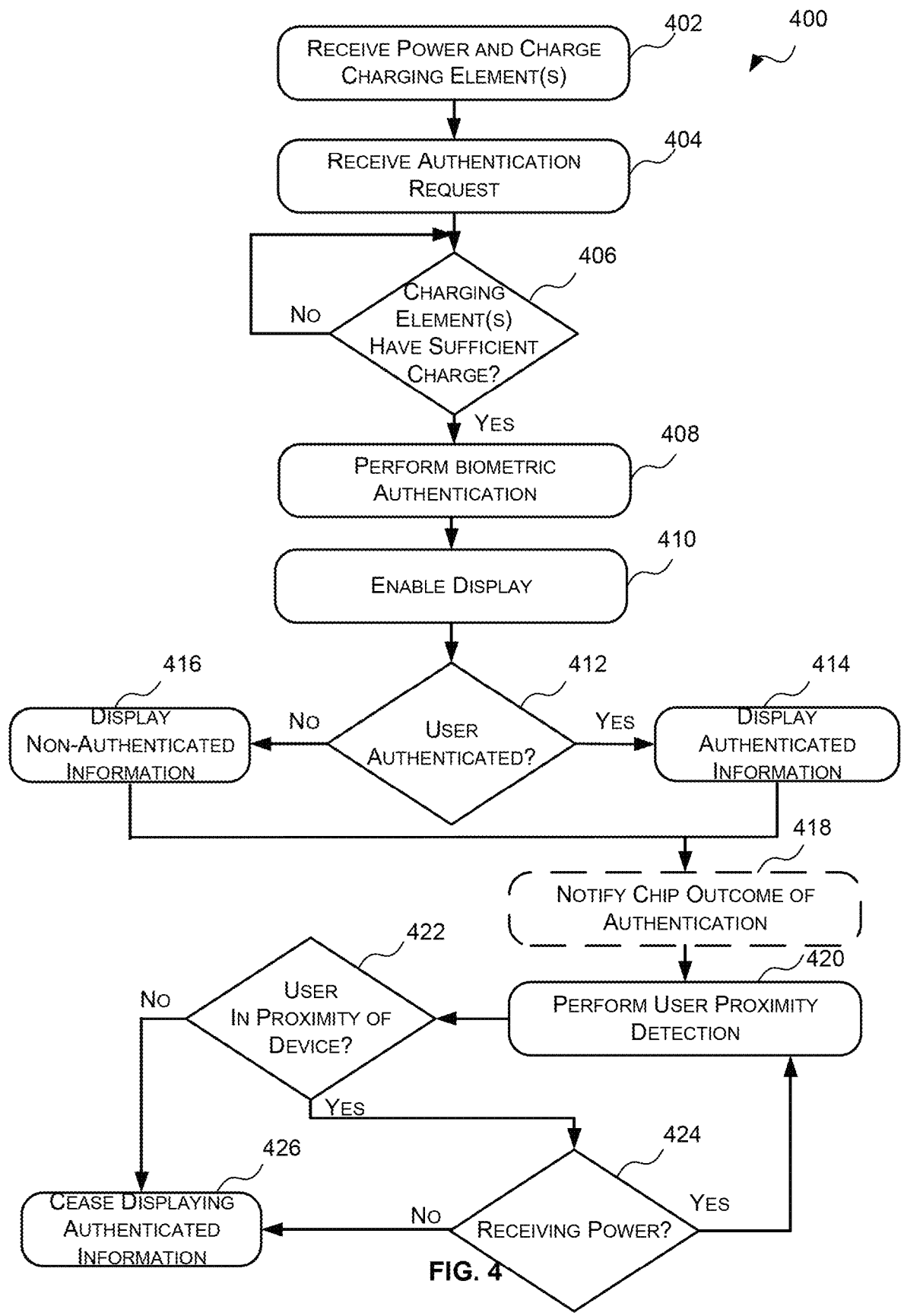
FIG. 4 is a flow diagram of a method of operating the biometric module of FIG. 1 when the device is in communication with a terminal.

Reference is now made to FIG. 4 which illustrates an example method 400 of operating the biometric module 200 to obtain biometric data for use in biometrically authenticating the user and display authenticated information to a biometrically authenticated user which may be executed by the control unit 204 of FIG. 2 when the device 100 is operating in contact mode or contactless mode (i.e. when the device 100 is communicating with, and receiving power from, a terminal 102) to perform a first function associated with the device. The method 400 begins at block 402 where the control unit 204 begins receiving power from the terminal 102 (i.e. is powered) (e.g. via the power management unit) and begins storing energy in one or more charging elements (e.g. capacitors).

As described above, when the device 100 is operating in contact mode the device 100 (and thus the biometric module 200) receives power via the contact elements and when the device 100 is operating in contactless mode the device 100 (and thus the biometric module 200) receives power via the antenna. As described above, the biometric module 200 may be directly connected to the contact element(s) and/or the antenna so that the biometric module 200 can receive power (or harvest power) directly therefrom, or the contact element(s) and/or the antenna may only be connected to the chip 106 and the biometric module 200 may receive power from the contact element(s) or the antenna via the chip 106.

As described above, the biometric module 200 (e.g. the power management unit 202) may comprise one or more charging elements (e.g. one or more capacitors) for storing power or energy which are arranged so that the one or more charging elements are charged when the biometric module 200 receives power from an external power source (e.g. from the terminal 102).

At block 404, the control unit 204 receives a biometric authentication request from the chip 106 as part of performing the first function associated with the device 100. In some cases, the authentication request may have been initiated by the chip 106. In other cases, the authentication request may have been initiated by the terminal 102 as part of performing the first function. The method 400 then proceeds to block 406.

At block 406, the control unit 204 determines whether the charging element(s) has/have sufficient charge or power to be able to cause the display screen 212 to cease displaying authenticated information in the event that the biometric module 200 is no longer receiving power from an external power source. If it is determined that the charging element(s) has/have sufficient charge, then the method 400 proceeds to block 408. If, however, it is determined that the charging element(s) do not have sufficient charge then the method 400 remains at block 406 until the charging element(s) do have sufficient charge.

Waiting until the charging element(s) has/have sufficient power so that any authenticated information displayed on the display screen 212 can be removed therefrom ensures that biometric module 200 does not display authenticated information on the display screen 212 until it knows it will be able to remove the authenticated information from the display screen 212 even in the event of loss of the power supply. As described above, the amount of charge or power required to cease displaying authenticated information on a display screen 212 in the event that the biometric module 200 loses its power source may be based on the size of the display screen and the display technology used to implement the display screen. For example, where the display screen is implemented by display technology (e.g. OLED or microLED) that will cease displaying information when power is no longer applied thereto then the power required to cease displaying authenticated information will be zero. However, where the display screen is implemented by display technology (e.g. LCD or EPD) that can continue to display information even when power is no longer applied thereto then the amount of power required to cease displaying authenticated information will be non-zero.

As described above, in some cases the power management until 202 of the biometric module 200 (or another component thereof) may comprise a detection circuit (e.g. a brown-out detection circuit) that is configured to detect whether the one or more charging elements have sufficient power by comparing the energy or power stored in the charging element(s) to a threshold. The threshold may be fixed based on the display technology used to implement the display screen and the size of the display screen or area of the display screen, or the threshold may be configurable based on the display technology and size of the display. Once it has been determined that sufficient power or energy has been stored by the charging element(s) the method 400 proceeds to block 408.

At block 408, the control unit 204 causes the biometric module 200 to initiate a biometric authentication process. As described above, in some cases, the control unit 204 is configured to cause the biometric module 200 to initiate the biometric authentication by causing the biometric sensor 208 (via the biometric controller 206) to capture biometric data of a user; and performing biometric matching at the control unit 204 between the biometric data captured by the biometric sensor 208 and stored template data to determine if the user is biometrically identified or authenticated. In other cases, the biometric matching of the biometric data captured by the biometric sensor 208 may be performed by the chip 106. In yet other cases, the biometric matching of the biometric data captured by the biometric sensor 208 may be performed by the control unit 204 in conjunction with the chip 106 (e.g. the control unit 204 and the chip 106 may each perform a portion of the biometric matching process). Once the biometric authentication has been performed the method 400 proceeds to block 410.

At block 410, the control unit 204 enables the display screen 212. In some cases, the control unit 204 may be configured to enable the display screen 212 by causing the power management unit 202 to supply power to the display controller 210 and the display screen 212. In some cases, the control unit 204 may be configured to only enable the display screen 212 after the biometric authentication processing is complete because in some cases the power being received from the terminal may not be sufficient to perform biometric authentication and power the display screen 212. Once the control unit 204 has enabled the display screen 212 the method 400 proceeds to block 412.

At block 412, the control unit 204 determines whether the user was biometrically authenticated by the biometric authentication process performed at block 408. If the user was biometrically authenticated, then it is 'safe' to display authenticated information and the method 400 proceeds to block 414 where the control unit 204 causes the display screen 212 to display authenticated information. The control unit 204 may cause the display screen 212 to display authenticated information by sending instructions and/or other signals to the display controller 210 which identifies the authenticated information to be displayed and causes the display controller 210 to control the display screen 212 so as to display the authenticated information. The authenticated information may be generated, for example, by the control unit 204 or the chip 106. In some cases, the authenticated information may comprise information for use in performing the first function associated with the device. For example, where the first function is performing a credit card transaction via the terminal 102 the authenticated information may be a dCVV which is generated by the chip 106. In some cases, non-authenticated information may also be displayed together with the authenticated information.

If, however, the user was not biometrically authenticated then it is not 'safe' to display authenticated information and the method 400 proceeds to block 416 where the control unit 204 causes the display screen 212 to display non-authenticated information. For example, in some cases the control unit 204 may cause the display screen 212 to display information notifying the user that the biometric authentication failed. In some cases, if a first biometric authentication has failed (i.e. the user was not authenticated or identified via the first biometric authentication process) a second biometric authentication process may be performed. In these cases, the non-authenticated information may comprise information notifying the user that another biometric authentication will be attempted. In some cases, each subsequent biometric authentication may be performed with a higher matching threshold (i.e. the biometric data may have to more closely match the template data for the user to be authenticated or identified).

Once block 414 or block 416 has been completed the method 400 may proceed to block 418 or the method 400 may proceed directly to block 420. For example, as described above the biometric matching of the captured biometric data may be performed by the module 200, the chip 106 or the module 200 in conjunction with the chip 106. Where the biometric matching is performed entirely by the module 200 the method 400 may proceed to block 418 where the control unit 214 notifies the chip 106 whether or not the user was authenticated. Where, however, the biometric matching is performed at least partially by the chip 106 the chip 106 may know, or be aware of, the outcome of the authentication and so the method 400 may proceed directly to block 420.

Once the chip 106 is aware of the outcome of the biometric authentication, the chip 106 may then respond accordingly to the terminal 102. In some cases, the first function may only be completed if the user was biometrically authenticated. Accordingly, in these cases if the user was not biometrically authenticated the chip 106 may cease performing the first function.

At block 420, the control unit 204 causes the biometric module 200 to perform user proximity detection or user present detection (e.g. to determine whether the user is still in the proximity of (e.g. in contact with) the device 100). As described above, in some cases, the control unit 204 may be configured to determine whether the user is proximate the device 100 by: causing the biometric sensor 208 to capture proximity data that can be used to determine whether the user is proximate the device 100; and determining from the captured proximity data whether the user is still present. In some cases, performing user proximity detection consumes less power than performing full biometric authentication. This may allow the biometric module 200 to both display information on the display screen 212 and perform user proximity detection when the biometric module 200 is receiving a limited amount of power from the terminal (e.g. when the device 100 is operating in contactless mode). In contrast, when the biometric module 200 is receiving a limited amount of power from the terminal 102 (e.g. when the device 100 is operating in contactless mode) the biometric module 200 may not be able to both display information on the display screen 212 and perform full biometric authentication.

In some cases, the biometric data captured by the biometric sensor 208 for use in performing biometric authentication may be different then the proximity data captured by the biometric sensor 208 for use in performing user proximity detection or user presence detection. For example, as described above, in some cases the biometric sensor 208 may be able to operate in in a first mode where it can capture biometric data for use in performing biometric authentication and a second mode where it can capture different data (e.g. proximity data) for use in performing user proximity detection. For example, where the biometric sensor is a fingerprint sensor the fingerprint sensor may be able to operate in fingerprint sensing mode to obtain a fingerprint scan or image of the user's finger, or a finger detection mode to determine if a finger is touching, or in contact with, the sensor. In this example, to perform user proximity detection or user presence detection the control unit 204 may be configured to cause the display screen 212 to operate in the finger detection mode to determine if a finger is in contact with the sensor and the control unit 212 may determine that the user is in proximity of the device 100 if the proximity data obtained when the sensor is operating in finger detection mode indicates that the user's finger is touching (or is in contact with) the sensor. Once the user proximity detection or the user presence detection has been performed the method 400 proceeds to block 422.

At block 422, the control unit 204 determines whether, based on the user proximity detection, the user is proximate the device 100 or whether the user is present (e.g. whether the user's finger is in contact with the fingerprint sensor). If it is determined that the user is proximate the device 100 then it is still 'safe' to continue to display authenticated information (if displayed) and the method 400 proceeds to block 424 where a determination is made as to whether the biometric module 200 is still receiving power from the terminal 102. If, however, it is determined, based on the user proximity detection, that the user is not proximate the device 100 or the user is not present then it is not 'safe' to display authenticated information and the method 400 proceeds to block 426 where the control unit 204 causes the display screen 212 to cease displaying authenticated information.

At block 424, the control unit 204 determines whether the biometric module 200 is still receiving power from the terminal 102 (e.g. directly or indirectly via the antenna or the contact element(s)). In some cases, the power management unit 202 may comprise a circuit or module for monitoring the power received (e.g. from the terminal directly or indirectly from the antenna or the contact element(s)) and the power management unit 202 may notify the control unit 204 when it is no longer receiving sufficient power or energy to power the biometric module 200. If it is determined that the biometric module 200 is no longer receiving power (or sufficient power) from the terminal 102 it is no longer 'safe' to display authenticated information because the biometric module 200 can no longer verify the user (e.g. via biometric authentication) or verify the user is still present or proximate the device 100 (e.g. via user proximity detection or user presence detection) so the method 400 proceeds to block 426.

At block 426, the control unit 204 causes the display screen 212 to cease displaying authenticated information.

In some cases, the control unit 204 may cause the display screen 212 to cease displaying authenticated information by causing the display screen 212 to display an image or information that does not comprise authenticated information. However, depending on the display technology and whether or not the module 200 is still receiving sufficient power for operation thereof, the display screen 212 may continue to display non-authenticated information. For example, if the display screen is currently display a company logo (e.g. non-authenticated information) and a dCVV (e.g. authenticated information) the control unit 204 may cause the display screen 204 to no longer display the dCVV (e.g. authenticated information), but to continue to display the logo (e.g. non-authenticated information). Causing an updated or new image to be displayed on the display screen 212 requires power so if the module 200 is not currently receiving sufficient power for operation the power required to update the information or image displayed by the display screen may be obtained, or drawn, from the one or more charging elements.

In other cases, the control unit 204 may cause the display screen 212 to cease displaying authenticated information by blanking the display (e.g. causing the display screen 212 to no longer display any information or image). Where the display screen 212 is implemented using display technology that will cease displaying information when power is removed therefrom then this can be accomplished by no longer supplying power to the display screen 212. Where, however the display screen 212 is implemented using display technology that can continue to display information even after power is removed therefrom then this can be accomplished by causing an update to the image displayed by the display screen 212. This, however, requires power. Where the biometric module 200 is still receiving power from the terminal 102 the power used to cause the image displayed by the display screen 212 to be blanked may be drawn from the power received from the terminal as normal. Where, however, the biometric module 200 is no longer receiving power from the terminal 102 the power used to cause the image displayed by the display screen to be blanked may be drawn from the one or more charging elements (e.g. charging capacitors/reservoir capacitors). Accordingly, in these cases both authenticated and non-authenticated information are removed from the display screen.

Once the control unit 204 has caused the display screen 212 to cease displaying authenticated information the method 400 ends.

Although in the method 400 of FIG. 4 the display screen 212 is enabled regardless of whether the user has been biometrically authenticated and only the type of information that is displayed on the display screen 212 differs based on whether the user was biometrically authenticated or not, in other examples the display screen 212 may only be enabled if the user is biometrically authenticated. Accordingly, in these examples the display screen 212 may be disabled (i.e. will not display any information) until the user is biometrically authenticated. This may allow the display screen to remain hidden until the user is biometrically authenticated or identified.

Although in FIG. 4 the biometric authentication and the displaying of authenticated information is only performed if sufficient power has been stored by the charging element(s) to be able to cease displaying authenticated information, in other examples (e.g. when the display screen 212 is implemented by a display technology that will only display an image, or information, when power is applied thereto) the biometric module may not comprise charging elements and so the method 400 may proceed directly to block 408 after receiving a request to perform biometric authentication (e.g. block 406 may be skipped).

In some cases, the chip 106 may be configured to communicate with the terminal 102 in accordance with a contactless transmission protocol when the device 100 is operating in contactless mode whereby a message, or command, send by the terminal sets a specified waiting time for response from the chip to maintain a connection with the terminal. The contactless protocol may be specified by the ISO14443 and/or EMVCo® standards, for example. The chip 106 can communicate requests to the terminal 102 that extend the waiting time for response, but each request is to be sent prior to the expiry of the existing waiting time, otherwise the terminal assumes connection to the chip has failed. Thus, the transmission protocol governing communications between the chip and terminal may set timing restrictions on those communications. In particular, the contactless protocol may be such that failure by the chip 106 to respond to the terminal 102 prior to the expiry of the specified waiting time (by communicating a waiting time extension request or some other message) causes the connection between the chip and the terminal 101 to fail (e.g. time out).

Specifically, the ISO14443 and EMVCo® standards specify that the terminal 102, having sent a command to the chip 106, sets an initial waiting time (known as the frame waiting time (FWT) for a response from the chip 106. The FWT is the maximum amount of time permitted for the chip 106 to initiate sending a response back to the terminal 102. Failure by the chip 106 to send a response to the terminal within the FWT may result in the communication connection between the chip 106 and the terminal 1032 being lost, for example timed out. The value of the FWT can be negotiated between the device 100 and the terminal 102. The waiting time extension request may be denoted S(WTX). In response to receiving the waiting time extension request, the terminal extends the waiting time for a response from the chip 106. The device 100 may extend the waiting time by the frame waiting time FWT (i.e., it may extend the waiting time by an amount equal to the initial waiting time). A waiting time extension request may be made at any time before the expiry of the current waiting time.

The biometric module 200 is configured to obtain biometric data of a user which can be used to biometrically authenticate the user (e.g. at the request of the chip 106) and display authenticated information to a biometrically authenticated user (which may be used in performing in the first function). The biometric module 200 may also perform all or portion of the biometric authentication of the user based on the captured biometric data (e.g. the biometric module 200 may perform all or a portion of a biometric matching process on the captured biometric data to biometrically authenticate the user). The processing performed by the biometric module 200 may be formed be a number of processing steps. A processing step may take longer to complete than the waiting time interval set by the terminal (e.g. the time window between successive waiting time extension requests). Accordingly, the processing performed by the biometric module 200 and the chip 106 need to be synchronized with the waiting time extension requests sent by the chip 106 to the terminal 102.

Figure 5:
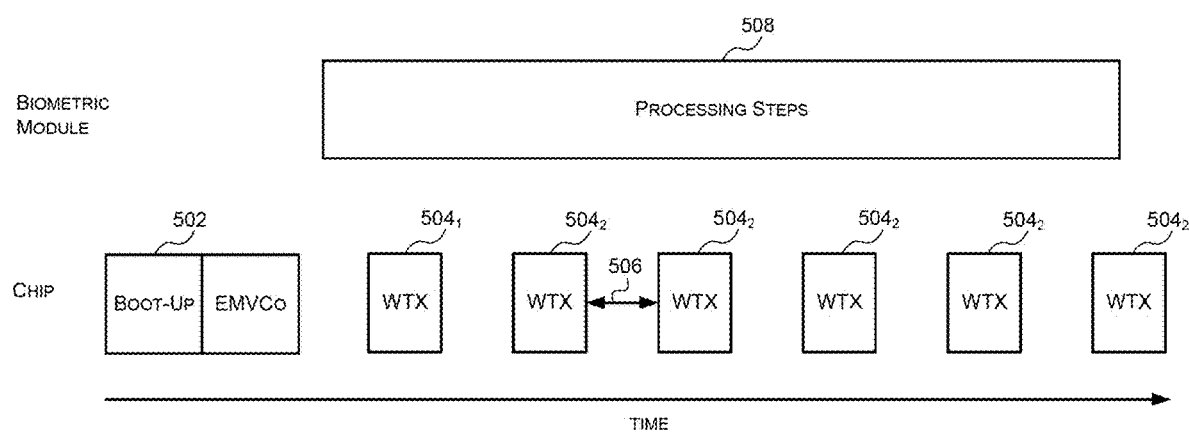
FIG. 5 is a timing diagram illustrating an example operation of the chip and the biometric module of FIG. 1.

Reference is now made to FIG. 5 which illustrates the timing restrictions imposed by the ISO14443 and EMVCo® standards. The boot-up of the chip 106 and biometric module 200 and communication with the terminal in accordance with the EMVCo® standards is shown at 502. The series of waiting time extension requests communicated from the chip 106 to the terminal 102 are denoted $504_1$ to $504_6$. The time period in which the terminal expects a response from the chip 106 may be referred to herein as a waiting time interval. The waiting time internal is the time period between successive communications between the chip 106 and the terminal imposed by timing restrictions of the standard governing those communications. The waiting time interval is a time period in which a communication (e.g. a response to the command issued by the terminal 102, or waiting time extension request) is to be sent from the chip 106 to the terminal 102 to maintain the communication connection. The waiting time interval may therefore be a time period between the time the command was received from the terminal and the initial specified waiting time, or the time period between making a waiting time extension request and the new extended waiting time resulting from that request. That is, the waiting time interval may be viewed as the time period between two scheduled communications between the chip and the terminal. In this example, the waiting time interval is equal to the frame waiting time FWT. An example frame waiting time is shown at 506.

As described above, the biometric module 200 operates to capture biometric data of a user which can be used to biometrically authenticate the user and display authenticated information to a biometrically authenticated user. In some cases, the biometric module 200 may be configured to perform all or a portion of the biometric authentication of the user based on the captured biometric data (e.g. the biometric module 200 may be configured to perform all or a portion of a biometric matching process on the captured biometric data to authenticate the user). In other cases, the biometric module 200 may be configured to provide the captured biometric data to another component (e.g. the chip 106) that performs the biometric authentication and then receives information from the other component indicating whether the biometric authentication was successful or not. The performance of these functions may be requested by the terminal. The processing performed by the biometric module 200 (e.g. the processing set out in FIG. 4, for example) is generally shown at 508. As shown in FIG. 5 the processing performed by the biometric module 200 may exceed one or more waiting time intervals.

It is desirable for the biometric module 200 not to perform its functioning during the periods the chip 106 is communication with the terminal 102. This is for two main reasons. Firstly, when the device 100 is operating in contactless mode, the power that can be harvested from the wireless signal emitted from the terminal 102 may be limited and the power that is harvested may be prioritized to support the scheduled communications with the terminal 102 necessitated by the standards the device 100 is operating in compliance with. Secondly, power drawn by the biometric module 200 during periods the chip 106 is communicating with the terminal affects the load modulation of the signal emitted by the terminal, which can appear as extra noise to the terminal. In other words, power drawn by the biometric module 200 may cause interference in the communications between the chip 106 and the terminal 102.

To avoid these problems, the processing steps 508 performed by the biometric module 200 (e.g. the steps of the method 400 of FIG. 4) may be further partitioned into a plurality of discrete operations, or tasks. Each task may take a reduced amount of time to complete than the processing step of which it forms part. Processing performed by the biometric module 200 can be started or paused on the boundaries between discrete operations. In other words, processing performed by the biometric module 200 may be paused upon completion of a discrete task, and resumed by processing a subsequent discrete task. It is possible for the processes 508 performed by the biometric module 200 to be partitioned into discrete tasks with varying degrees of granularity. For example, a discrete operation may refer to one of the biometric authentication steps described above (e.g. image acquisition by the sensor) or one of the user proximity detection steps described above (e.g. acquiring proximity data for use in performing user proximity detection). Alternatively, a discrete operation may be a combination of biometric authentication/user proximity detection steps, or part of an authentication step/proximity detection step.

The device 100 then operates to synchronise the processing of these discrete operations with the scheduled communications between the device 100 and the terminal 102 (which in this example, are the waiting time extension requests S(WTX). The device 100 performs this synchronization so that the discrete operations are performed within the waiting period.

The Applicant's U.S. patent application Ser. No. 15/883,543, which is herein incorporated in its entirety, describes three approaches for performing the synchronisation. It is submitted that any of the three described methods may be used to synchronize the processing performed by the biometric module 200 and the communications between the chip 106 and the terminal 102 to ensure that the communications between the chip 106 and the terminal 102 do not timeout and/or are not compromised.

In some cases, in addition to the biometric module 200, being able to obtain biometric data of a user for use in biometrically authenticating the user and display authenticated information (and, optionally, non-authenticated information) to an authenticated user when the device 100 (i.e. the chip 106) is in communication with a terminal 102 as part of performing a first function (e.g. executing a financial transaction) (which may be referred to herein as the terminal mode of operation), the biometric module 200 may also be able to obtain biometric data of a user for use in authenticating the user and display authenticated information (and, optionally, non-authenticated information) to a biometrically authenticated user when the device 100 is not in communication with a terminal 102 (which may be referred to herein as the non-terminal mode of operation). For example, where the device 100 is a smart card implementing a credit card the module 200 may be able to provide information to a user to enable the user to securely perform a credit card transaction via, for example, the Internet or telephone. Specifically, the module 200 may be configured to obtain biometric data of the user which can be used to biometrically authenticate the user and, once the user is biometrically authenticated provide them with a dCVV or the credit card number itself which may be entered on a website, or provided to an individual over the telephone, to complete the transaction. Such functionality would make it extremely difficult, if not impossible, for a person to use a stolen card to complete a transaction via the Internet or via telephone which adds an additional layer of security.

Since the device 100 does not have its own internal power source, and is designed to receive power from a terminal, for the device 100 (and specifically the biometric module 200) to be able to obtain biometric data for use in biometrically authenticating the user and display authenticated information (and non-authenticated information) without receiving power from a terminal 102 (i.e. operate in non-terminal mode) the device 100 must receive power from a removable external power supply or device. A power supply is said to be removable with respect to the device 100 if it does not form part of the device 100 and can be removed therefrom without altering the structure or function of the device 100. The removable external device may supply power to the device 100 in a contact manner (e.g. via the contact element(s)) or a contactless manner (e.g. by transmitting a wireless signal which is received by the antenna and from which energy can be harvested therefrom). Examples of external devices which may be used to provide power to the device 100 are described in the Applicant's U.S. Pat. No. 10,282,651 and U.S. Patent Application No. 62/872,524 which are herein incorporated by reference in their entirety, and U.S. Pat. No. 10,187,212 and include, but are not limited to a powered sleeve or overlap that interacts or makes contact with the contact element(s) of the device 100 to provide power thereto, an NFC field generator which provides power to the device 100 via the antenna, a wireless charge field generator (e.g. the "Qi" standard) that provides power to the device 100 via the antenna; or a cable with a contact plate that is connected/connectable to a power source (e.g. a USB port which can be connected to a USB power source, such as a computer) that can make contact with the contact element(s) of the device 100 to provide power thereto.

Figure 6:
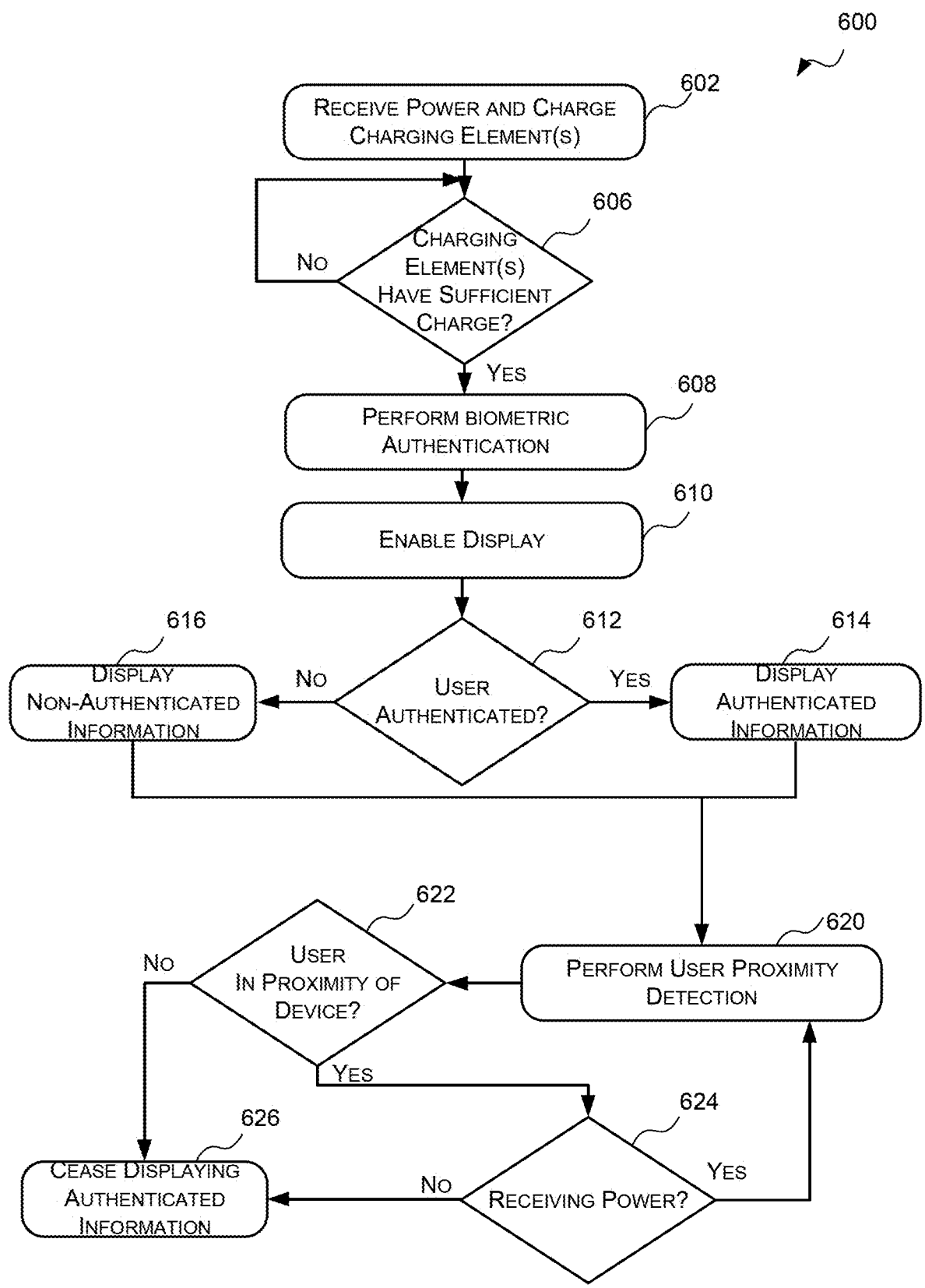
FIG. 6 is a flow diagram of an example method of operating the biometric module of FIG. 1 when the device is not in communication with a terminal.

Reference is now made to FIG. 6 which illustrates an example method 600, which may be implemented by the control unit 204 of FIG. 2, of operating the biometric module 200 to perform biometric authentication and display authenticated information to a biometrically authenticated user when the device 100 is not in communication with a terminal 102, but is receiving power from an external power source such as those described in the previous paragraph (i.e. when the biometric module 200 is operating in non-terminal mode). The method 600 of FIG. 6 is the same as the method 400 of FIG. 4 except the method doesn't comprise receiving a request for biometric authentication from the chip 106 (block 404) nor does it comprise notifying the chip 106 of the outcome of the authentication (block 418). The remainder of the blocks 602, 606, 608, 610, 612, 614, 616, 620, 622, 624 and 646 correspond to blocks 402, 406, 408, 410, 412, 414, 416, 420, 422, 424 and 426 of the method 400 of FIG. 4 respectively. In some cases, when the biometric module 200 is operating in non-terminal mode the biometric module 200 may still communicate with the chip 106 to obtain the authenticated information (e.g. dCVV or credit card number) which is securely stored by, or is accessible via, the chip 106. Similarly, when the biometric module 200 is operating in non-terminal mode the biometric module 200 may still communicate with the chip 106 to obtain the non-authenticated information which is stored by, or is accessible via, the chip 106.

The biometric module 200 may be able to identify whether the device 100 is in communication with a terminal 102 or whether it is simply receiving power from an external power source, so as to know whether to operate in accordance with the method 400 of FIG. 4 or the method 600 of FIG. 6. The biometric module 200 may be configured to make this distinction in any suitable manner. For example, in some cases, the biometric module 200 may be configured to determine that the device 100 is not in communication with a terminal 102 if the biometric module 200 detects that it is receiving power, but it does not receive an authentication request from the chip 106 within a predetermined period of time.

When the biometric module 200 is operating in non-terminal mode the chip 106 is not in communication with the terminal 102 so the processing performed by the biometric module 200 in this mode (e.g. the steps set out in the method 600 of FIG. 6) does not have to be scheduled around the communications between the chip 106 and the terminal 102 which simplifies the processing performed by the biometric module 200 in this mode of operation.

In some cases, it may be difficult to for a user to complete a transaction via the Internet or otherwise while maintaining proximity to the device 100 so in other example methods of operating the biometric module 200 in non-terminal mode the biometric module 200 may not perform user proximity detection and may only cease displaying authenticated information (and optionally, also non-authenticated information) if has been detected that the biometric module 200 is no longer receiving power (or sufficient power) from the external power source. For example, where the sensor is a fingerprint sensor and user proximity detection comprises detecting whether the user's finger is in contact with the fingerprint sensor it may make it difficult for a user to complete an Internet transaction if they have to keep one of their fingers on the fingerprint sensor as it may make it difficult for them to type or navigate the Internet. Specifically, if the user proximity detection and disabling the display screen in relation to detecting the user is no longer proximate the device is disabled then the user merely has to place their finger on the sensor for authentication and once authenticated can remove their finger therefrom.

Figure 8:
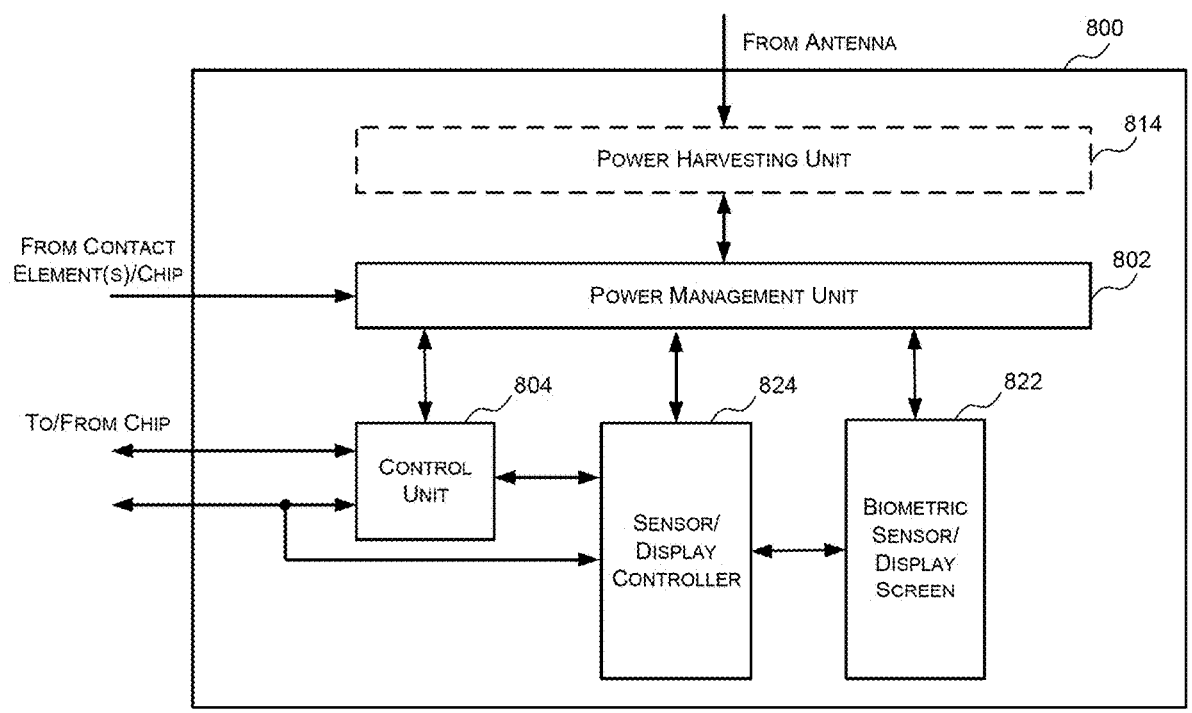
FIG. 8 is a block diagram of a third example implementation of the biometric module of FIG. 2.

While FIG. 2 shows the biometric sensor and the display screen being controlled by separate and distinct controllers (i.e. biometric controller 206 controls the operation of the biometric sensor 208 and the display controller 210 controls the operation of the display screen 212) which are both controlled by the control unit 204 it will be evident to a person of skill in the art that this is an example only and that in other examples the functions of two or more of the control unit 204, biometric controller 206 and display controller 210 may be performed by a single component. For example, FIG. 8 illustrates a second example biometric module 700 which can be used to implement the biometric module 108 of FIG. 1. In this example, the biometric module 700, like the biometric module 200 of FIG. 2, comprises a power management unit 702, a control unit 704, a biometric sensor 708, a display screen 712 and, optionally a power harvesting unit 714 which operate in the same manner as the corresponding components of the biometric module 200 of FIG. 2, however the biometric module 700 comprises only a single controller 720 that controls the operation of both the biometric sensor 708 and the display screen 712. Accordingly, in this example, the single controller 720 performs the functions of the biometric controller 206 and the display controller 210 of the biometric module 200 of FIG. 2. It yet other examples, the functions of the control unit 204, the biometric controller 206, and the display controller 210 may be performed by a single component, such as a single control unit.

Figure 7:
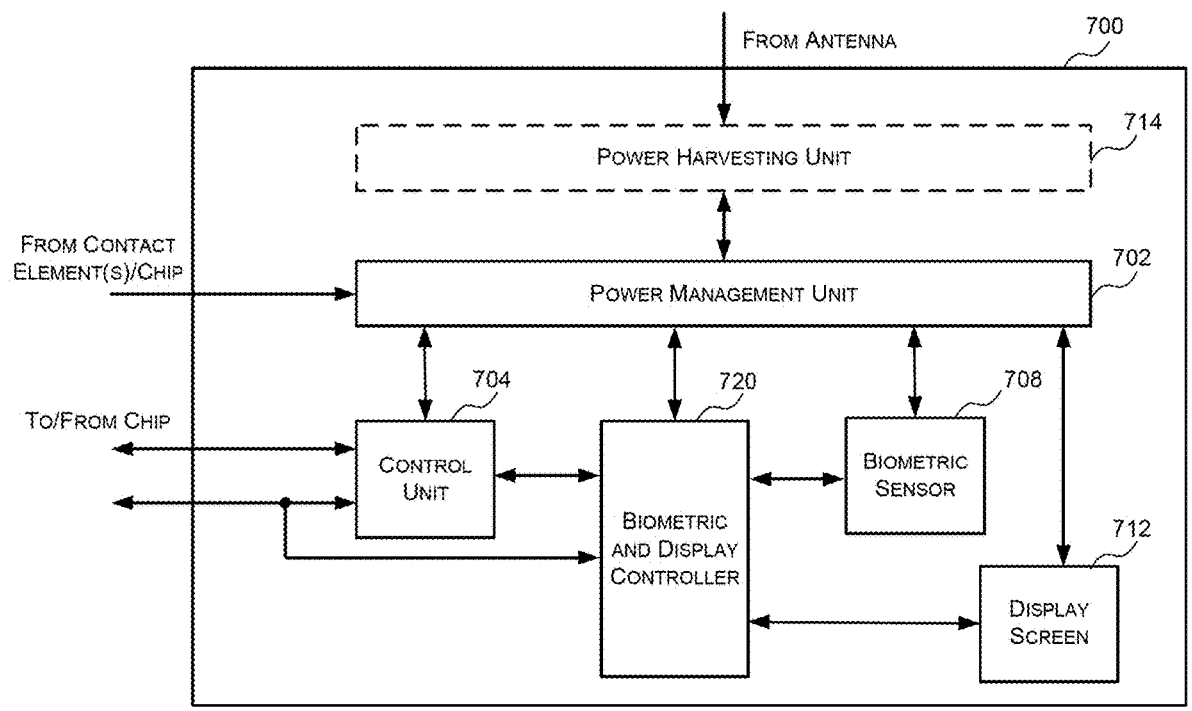
FIG. 7 is a block diagram of a second example implementation of the biometric module of FIG. 2.

While FIGS. 2 and 7 show the biometric sensor and the display screen being separate and distinct components, in other cases the biometric sensor and the display screen may be implemented by a single component. For example, FIG. 8 illustrates a third example biometric module 800 which can be used to implement the biometric module 108 of FIG. 1 in which the biometric sensor and the display screen are implemented by a single sensor/display component. In this example, like the biometric module 200 of FIG. 2 the biometric module 800 comprises a power management unit 802, a control unit 804 and, optionally a power harvesting unit 814 which operate in the same manner as the corresponding components of the biometric module 200 of FIG. 2, however the biometric module 800 only comprises a single sensor/display component 822 which can perform biometric sensor functions and display functions, which is controlled by a single controller 824 (e.g. ASIC). Specifically, the single controller 824 (e.g. ASIC) is configured control the sensor/display component 822 to cause it to capture biometric data of the user and to display authenticated and/or non-authenticated information as directed by the control unit 804.

Figure 9:
FIG. 9 is a schematic diagram of an example smart card with a combined biometric sensor/display module.

In some cases, the single sensor/display component 822 may be able to perform biometric sensing functions and display functions concurrently or simultaneously. In these cases, the sensor/display screen may be divided into sections or portions wherein the different sections or portions perform the sensor functions and the display functions respectively. For example, FIG. 9 shows an example sensor/display component 900 for a smart card where the sensor/display component 900 is configured to display information and perform fingerprint sensing concurrently. In this example the sensor/display component 900 has a screen 902 which is divided into a fingerprint sensing section 904 and a display section 906. The fingerprint sensing section 904 is configured to perform fingerprint sensing. The display section 906 is used to display information to the user (e.g. authorized information, such as a dCVV as shown in FIG. 9). As described above, the fingerprint sensing section 904 could be configured to operate in one of two modes—a fingerprint sensing mode (i.e. a biometric data sensing mode) in which the fingerprint sensing section detects ridges and valleys which are used to match against a template, and a finger detection mode (i.e. a user presence/proximity sensing mode) which is used to detect whether the user's finger is contacting the fingerprint sensing section 904.

In other cases, the combined sensor/display component may not be able to perform biometric sensing functions and display functions concurrently or simultaneously. Specifically, in these cases the sensor/display component may either be able to perform biometric sensing functions or display functions at one time.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The invention claimed is:

1. A biometric module configured to perform processing as part of a device configured to perform contactless or contact communication with a terminal, the module comprising:

a biometric sensor;
a display screen; and
a control unit configured to:
cause the biometric sensor to capture biometric data of a user which can be used to biometrically authenticate the user;
obtain biometric authentication information indicating whether the user was biometrically authenticated based on the captured biometric data;
in response to the biometric authentication information indicating the user was biometrically authenticated, cause the display screen to display authenticated information,
wherein the biometric module is powered by an external power source,
wherein the control unit is further configured to, subsequent to causing the display screen to display authenticated information, determine whether the biometric module is currently receiving power from the external power source and in response to determining the biometric module is not currently receiving power from the external power source, cause the display screen to cease displaying the authenticated information,
wherein the biometric module further comprises one or more charging elements for storing charge, and wherein the one or more charging elements are charged when the biometric module is receiving power from the external power source,
wherein the control unit is further configured to only cause the display screen to display authenticated information when the charge stored by the one or more charging elements exceeds a threshold, and
wherein the threshold is set such that the one or more charging elements hold sufficient charge to cause the display screen to display a different image when the module is not receiving power from the external power source.

2. The biometric module of claim 1, wherein the one or more charging elements comprises one or more capacitors.

3. The biometric module of claim 1, further comprising a threshold detecting circuit for detecting whether the charge stored by the one or more charging elements exceeds the threshold.

4. The biometric module of claim 3, wherein the threshold detecting circuit is a brown-out detection circuit.

5. The biometric module of claim 1, wherein the control unit is configured to use energy stored in the one or more charging elements to cause the display screen to cease displaying the authenticated information.

6. The biometric module of claim 1, wherein the control unit is configured to cause the display screen to cease displaying the authenticated information by blanking the display screen.

7. The biometric module of claim 1, wherein the control unit is further configured to:
subsequent to causing the display screen to display authenticated information, cause the biometric sensor to capture proximity data indicative of whether the user is proximate the biometric module;
obtain proximity information indicating whether, based on the captured proximity data whether the user is proximate the biometric module; and
in response to the proximity information indicating that the user is not proximate the biometric module, cause the display screen to cease displaying the authenticated information.

8. The biometric module of claim 7, wherein the biometric sensor is a fingerprint sensor and the proximity data comprises data indicative of whether a user's finger is currently in contact with the fingerprint sensor.

9. The biometric module of claim 7, wherein the control unit is further configured to determine whether the user is proximate the biometric module based on the proximity data captured by the biometric sensor.

10. The biometric module of claim 1, wherein the control unit is further configured to perform at least a portion of the biometric authentication of the user based on the biometric data captured by the biometric sensor.

11. The biometric module of claim 1, wherein the control unit is configured to receive the biometric authentication information from an external component that performs the biometric authentication of the user based on the biometric data captured by the biometric sensor.

12. A device for contactless or contact communication with a terminal, the device comprising:
an embedded chip configured to generate data for communication to the terminal to perform a first function associated with the device; and
a biometric module comprising:
a biometric sensor;
a display screen; and
a control unit configured to:
cause the biometric sensor to capture biometric data of a user which can be used to biometrically authenticate the user;
obtain information indicating whether the user was biometrically authenticated based on the captured biometric data;
in response to the information indicating the user was biometrically authenticated, cause the display screen to display authenticated information,
wherein the biometric module is powered by an external power source,
wherein the control unit is further configured to, subsequent to causing the display screen to display authenticated information, determine whether the biometric module is currently receiving power from the external power source and in response to determining the biometric module is not currently receiving power from the external power source, cause the display screen to cease displaying the authenticated information,
wherein the biometric module further comprises one or more charging elements for storing charge, and wherein the one or more charging elements are charged when the biometric module is receiving power from the external power source,
wherein the control unit is further configured to only cause the display screen to display authenticated information when the charge stored by the one or more charging elements exceeds a threshold, and
wherein the threshold is set such that the one or more charging elements hold sufficient charge to cause the display screen to display a different image when the module is not receiving power from the external power source.

13. The device of claim 12, wherein the device is a smart card.

14. The device of claim 12, wherein the authenticated information comprises information to perform the first function associated with the device.

15. The device of claim 12, further comprising an antenna for receiving a wireless signal emitted by the terminal.

\* \* \* \* \*